United States Patent [19]
Sinovas et al.

[11] Patent Number: 5,647,546
[45] Date of Patent: Jul. 15, 1997

[54] STABMIXER

[75] Inventors: Rosa Maria Sinovas, Barcelona; Vicente Safont, Montgat; Mariano Peñaranda, Barcelona, all of Spain; Hans-Jürgen Golob, Friedrichsdorf, Germany

[73] Assignee: Braun Aktiengesellschaft, Kronberg, Germany

[21] Appl. No.: 527,356

[22] Filed: Sep. 12, 1995

[30] Foreign Application Priority Data

Feb. 3, 1995 [DE] Germany ............... 195 03 491.0

[51] Int. Cl.$^6$ .................................................. B02C 15/16
[52] U.S. Cl. .................................. 241/292.1; 241/282.2
[58] Field of Search ........................ 241/282.1, 282.2, 241/199.2, 292.1

[56] References Cited

U.S. PATENT DOCUMENTS 3,368,800  2/1968  Barnard.
3,856,220  12/1974  Waters.

FOREIGN PATENT DOCUMENTS 16 73 435   3/1954   Germany.
32 060     11/1955   Germany.
194646      1/1958   Germany .............. 241/292.1
U 17 91 741 7/1959   Germany.
25 53 511   6/1976   Germany.
3819432    12/1989   Germany .............. 241/292.1

*Primary Examiner*—Mark Rosenbaum
*Attorney, Agent, or Firm*—Fish & Richardson, P.C.

[57] ABSTRACT

The present invention comprises a rotating blade, in particular for the comminution of food materials, which is adapted to be attached to an operating shaft and which includes at least two blade supporting arms which extend radially from a mid-portion. The blade supporting arms each have a knife-edge with cutting edges on a free edge in the direction of rotation. According to the present invention, the knife-edge of the one supporting arm is directed upwardly and the knife-edge of the other supporting arm is directed downwardly, and in the area of the knife-edges the legs are profiled such that a portion projecting from the surface of the supporting arms is formed. The projecting portion is limited by the knife-edge on the one side and by a chamfered surface extending outwardly to the cutting edge on the other side. The knife-edge and the chamfered surface enclose a chamfer angle. A good cutting effect and mixing action is achieved thereby, and the handheld blender can be manufactured and operated particularly easily.

12 Claims, 1 Drawing Sheet

STABMIXER

The present invention relates to a blade for an electrically operated handheld blender.

Blades of this type for handheld blenders have been used for many years to comminute and blend most different food materials. The blades can be operated at different speeds depending on the foods to be comminuted. One requirement of such blades is the effective comminution of the materials to be treated. In addition, the blades are required to provide a good agitating action in order to blend the materials and thereby assist in the uniform comminution of the materials. Also, it is desirable that the blades for handheld blenders will not cause dangerous cuts if a user's hand touches them inadvertently.

German patent application No. 25 53 511 discloses a typical blade for handheld blenders. The rotating blade formed in a bell-shaped lid is made of a flat metal part having end portions bent upwardly and downwardly in the direction of the drive shaft, with the cutting edges being ground on one side of the end portions.

Another blade, which is also intended for use in handheld blenders, is disclosed in German utility model No. 17 91 741. This blade includes one supporting arm deflected at its end, while the other supporting arm is bent upwardly like a scoop at its edge extending radially towards the axis of the drive shaft, the scoop serving to increase the mixing action.

Further, U.S. Pat. No. 3,368,800 describes a blender having two arms which are bent slightly from the plane of a mid-portion in which the mounting support of the shaft is provided as an opening. The two deflected arms are each ground at their free, radially outwardly disposed edges and on a longitudinal edge which is at the front, when viewed in the circumferential direction of the blade. Due to the large cutting angles, less sharp cutting edges result in this arrangement. With a decreased cutting angle, too large grinding surfaces of the knife-edges would be caused requiring a complicated manufacture. On the other hand, the knife-edges would become too thin and too long, thereby reducing the useful life of the blades.

In view of the previously described state of the art and the blades known in the art, one object of the present invention is to provide a blade for handheld blenders having an improved cutting effect and additionally achieving a good mixing action within the bell-shaped lid of the handheld blender, simple and low-cost manufacture and a long useful life.

According to the invention, a comparatively large working space is provided which the blade covers in operation. On the one hand, this fact is due to the blades being arranged on the opposed supporting arms on opposite sides. In addition, the blade is profiled which improves the agitating effect in particular. As is the case with the arrangement of the knife-edges, the profilings are also provided on opposed surfaces of the supporting arms. Turbulences are caused by the profiling during operation of the blade which improve the mixing action.

Due to the formation of the projecting portions, it is possible, on the one hand, to machine on the one surface a particularly effective chamfered surface with a large chamfer angle. On the other hand, the knife-edge on the other opposed surface can be machined retroactively, if desired, in a simple fashion. Thereby, a particularly accurate and sharp chamfer or cutting angle for handheld blenders is achieved. However, this cutting angle must not be so sharp as to cause major injuries if, inadvertently, the hand of a user grips into the opening of the bell-shaped lid. Further, it favourably results from profiling that the blade becomes comparatively resistant to bending and torsion.

The foods are comminuted particularly easily and without requiring force because the chamfered surface of one of the supporting arms, which is directed into the bell-shaped lid, moves the foods upwardly during operation of the handheld blender, while the chamfered surface of the other supporting arm, which points from the bell-shaped lid outwardly, moves the foods downwardly. This results from the course of the chamfered surfaces which are inclined in opposition to the direction of rotation of the blade. Thus, the foods are bounced off the respective chamfered surface and turned upwardly from the downwardly directed supporting arm and downwardly from the upwardly directed supporting arm. Due to this reciprocal bouncing and, therefore, particularly quick and easy comminution of the foods, only a low contact force on the handheld blender is necessary nevertheless. This is favorable especially when comminuting solid foods such as carrots, because the contact force is always considerably greater than the force required for comminuting rather liquid foods.

The blade can be manufactured particularly easily by punching, stamping and bending to form its shape. In particular the chamfered surfaces and the projecting portion for the knide-edges and the angles of inclination are stamped.

To provide comparatively "sharp" cutting edges, chamfer angles of 15° to 30° are preferred according to a favorable aspect of the present invention. Smaller angles result in too acute cutting edges which may cause injuries if a user's hand inadvertently grips into the bell-shaped lid. Thus, a chamfer angle of 20° has proved to be particularly expedient.

The knife-edge can be smoothed and ground by way of a chip-cutting machining operation, in particular by grinding, in case it was not sufficiently sharp after stamping. In addition, a very simple and thus inexpensive arrangement is achieved thereby to grind the knife-edges from only one side in a preferably horizontal grinding plane. However, it is also possible to make the knife-edges in the stamping operation plane-parallel to the surface of the supporting arms without retroactive machining.

To achieve ease of manufacture, the grinding planes of the knife-edge extend in parallel to those planes in which the surfaces of the supporting arms extend. This permits easy machining of the knife-edges, and it is prevented that the grinding stone strikes against corners on the blade. The offset positioning of the knife-edges with respect to one another is considerably increased by the provision of the angle of inclination so that the working space covered by the blades is increased and the preparation time of the food materials is decreased.

Particularly good agitating and cutting results are achieved by way of an angle of inclination of 9° and 13°. It has been discovered in practical operations that an angle of inclination of 11° is preferred.

The knife-edges provided on the opposite blades are offset to an increased extent in their levels relative to each other as compared to the reciprocal arrangement of the knife-edges on the supporting arms. As a result, a still larger space is covered by the supporting arms and the cutting edges so that the food materials can be comminuted and blended in a still shorter time. In this arrangement, the angle of inclination is always dictated by the positioning of the knife-edge relative to the horizontal line. Thus, if the knife-edge is arranged below the horizontal line, the angle extends downwardly in relation to the horizontal line. Accordingly, the knife-edge will extend upwardly on the other side.

Consequently, the angle of inclination also extends upwardly from the horizontal line. This arrangement permits minimizing the axial forces acting upon the blade during agitating and comminuting food materials. In turn, this has positive effects on the bearing arrangement in the handheld blender in which these axial forces are supported. Generally, this support is provided by way of the axis of rotation coupled to the drive shaft and being part of the electric drive motor which is unrotatably fixed above the bell-shaped lid in the housing of the handheld blender.

A blade is provided by the particularly long cutting edge, extending both in radial and circumferential directions, its extension being formed by the flange, which has a long useful life as far as its sharpness is concerned. Likewise, the extension improves the cutting quality because the food materials are cut by requiring less energy.

Further details and features of the blade according to the present invention can be seen in the following description of one embodiment with reference to the accompanying drawing. In the drawing, FIG. 1 is a view of a blade in FIG. 2 from below in the direction Z.

Figure 1:
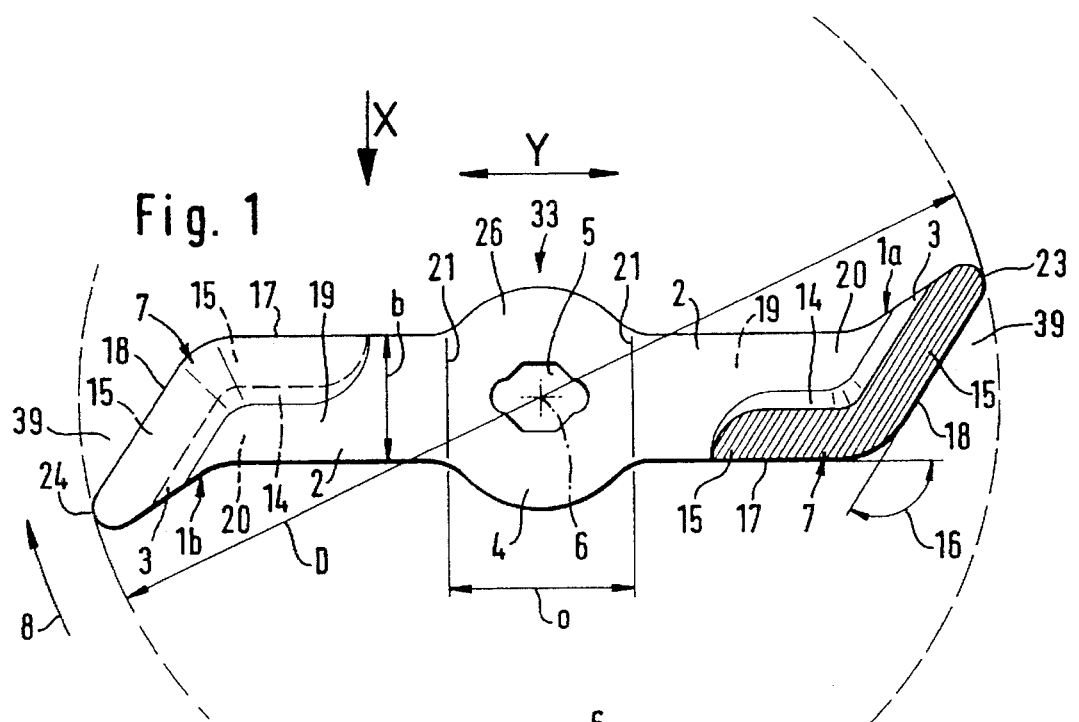
Figure 2:
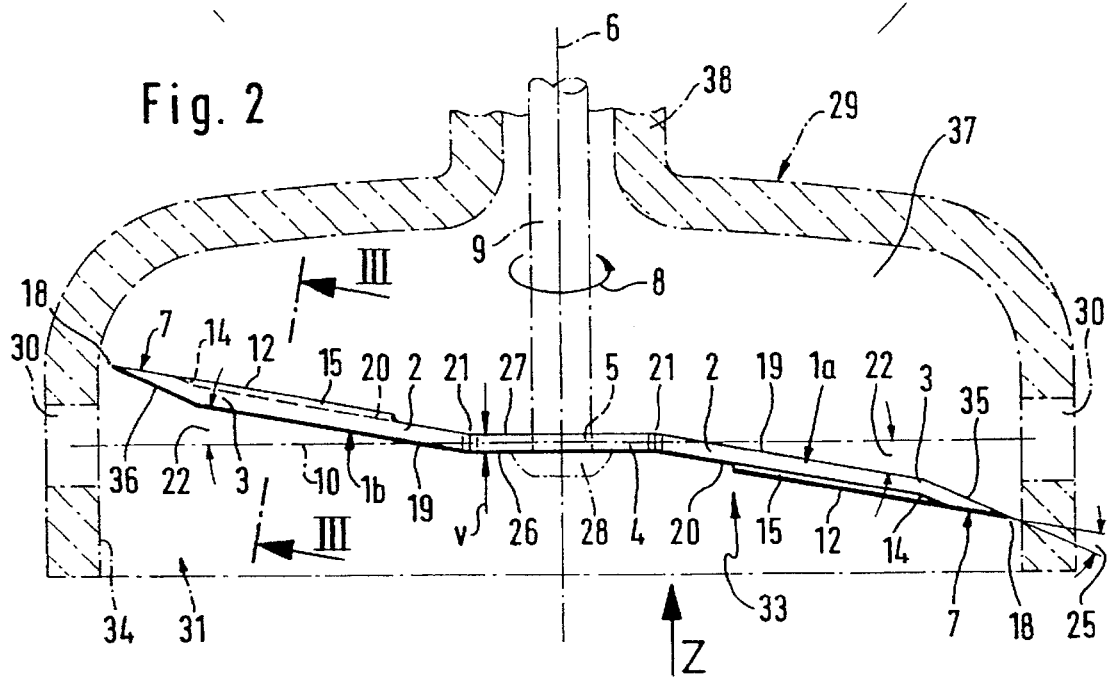
FIG. 2 is a side view of the blade in FIG. 1 in the direction X.
Figure 3:
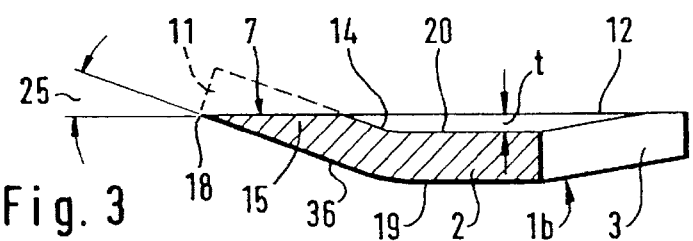
FIG. 3 is a cross-section taken along the line of intersection III—III in FIG. 2.

The blade 33, as shown in FIGS. 1, 2 and 3, has two supporting arms 1a and b, each of them being of L-type configuration, comprising a leg 2 and a short extension 3. The supporting arms 1a and 1b are connected to a mid-portion 4 which includes a central opening 5 to accommodate an operating shaft 9, shown in broken lines. The surfaces 26, 27 of the mid-portion 4 extend in parallel to the horizontal line 10. The axis 6 of the operating shaft 9 which is attached in the central opening 5 by a rivet head 28 (shown in broken lines), or rather the axis of rotation of the blade 33, is designated by reference numeral 6.

The operating shaft 9, as can be seen in German utility model No. 17 91 741, for example, is rotatably mounted in a housing stem and connected with an electric motor adapted to be turned on and off by a switch. The handheld blender shown in the above utility model corresponds to the handheld blender of the present application. Thus, further details which are not shown in the present application can be taken from the handheld blender in the utility model for the sake of simplicity.

The blade 33 is rotatably mounted in a bell-shaped lid 29 which is open downwardly, as can be seen in FIG. 2 in particular. The bell-shaped lid 29 includes apertures 30 through which the food materials, which are taken in through the opening 31 by the blade 33, are moved outwardly again. The inside wall 34 of the bell-shaped lid 29 extends at a small distance to the external cutting corners 23, 24.

A projecting portion 15 is provided on the parts of the supporting arms 1a and 1b, which are leading in the direction of rotation 8 in FIG. 1, i.e. the leg 2 and the extension 3. The surface of the projecting portion 15 is ground to provide a knife-edge 7 which, as viewed in the direction of rotation 8, ends at the free end in the cutting edges 17, 18 and the surfaces 20 at step 14. For better illustration, the knife-edge 7 in FIG. 1 is shown in shaded lines on the right-hand side because it can there be seen from above, while, however, on the left-hand side it points downwardly in the drawing plane. Starting from the points of deflection 21, the knife-edge 7 extends both along the radially extending cutting edge 17 of the leg 2 and along the radially outwardly disposed free cutting edge 18 of the extension 3 of the supporting arms 1a and 1b. In this configuration, the step 14 of the knife-edge 7 extends in parallel to the cutting edges 17, 18. The shaded visible surface of the right-hand knife-edge 7 is the ground and projecting portion 15 in FIG. 1. As can be seen in FIG. 2, the knife-edge 7 of the right-hand supporting arm 1a extends on the downwardly directed surface 20 of the blade 33, and the other knife-edge 7 extends on the left-hand supporting arm 1b on the upwardly directed surface 20.

It shall be noted that, for the sake of simplicity, identical parts on both the right-hand and the left-hand sides of the supporting arms 1a and 1b have been furnished with identical reference numerals.

In FIG. 2, an angle of inclination 22 is formed respectively between the horizontal line 10 and the surfaces 19, 20 of the leg 2 and the extensions 3. In each case, the angle of inclination 22 starts at the point of deflection 21 which extends substantially in parallel to the axis 6. Due to the angle of inclination 22, on the one hand, and the projecting portion 15, on the other hand, the cutting edges 17, 18 extend radially outwardly on the opposed sides of the supporting arms 1a and 1b on different levels or different planes, whereby better cutting and mixing results are achieved in particular. Those points on the diameter D which are most remote from each other form the cutting corners 23, 24. The diameter D amounts to 50 mm approximately. The widthes 'b' of the mid-portion 4 and the supporting arms 1a, 1b are equally large and amount to 7 mm approximately. The thickness 'v' of the blade 33 amounts to 1 mm approximately.

The blade 33 is a stamped part made from a thin metal sheet of stainless steel. Initially, the contour of the blade with the opening 5 is punched out and, subsequently, the punched part undergoes a stamping operation in which the step 14, the points of deflection 21 and more particularly the chamfered surfaces 35, 36 are made, with the latter surfaces being formed especially by cold-working the material. Still further solidification of the projecting portion 15 lying between the chamfer angle 25 is achieved by the resulting cold-hammered stamping operation, which is particularly favorable for the resistance to wear of the blade 33 and, thus, of the cutting edges 18. However, it is also possible that the punching and stamping operations are carried out in one single operation.

To subsequently grind the knife-edge 7, the projecting portion 11 is ground to a plane 12 so that only the projecting portion 15 remains. The grinding operation is continued until the cutting edges 17, 18 made for the handheld blender are sufficiently sharp, however, not so sharp that serious injuries would be caused in the event of a finger of a user's hand inadvertently touching the blade. Because the knife-edges 7 extend substantially in parallel to the surface 20 of the supporting arms 1a and 1b, the knife-edge 7 can be manufactured especially easily. A grinding tool (not shown) can work on this surface without being obstructed by other projecting parts of the blade. The flatter the chamfer angle 25 is, the sharper the cutting edges 17, 18 become. However, this also reduces the useful life of the knife sections and increases the risk of injury. A chamfer angle of 20° has proved to be particularly favorable for the blade 33 shown in FIGS. 1 to 3 which can be used exclusively on handheld blenders. In particular, this fact is due to the course of the supporting arms 1a and 1b causing the food materials to be moved extremely outwardly, thereby permitting them to move outwardly through the slots 30 in the bell-shaped lid 29.

Further, as can be seen in the FIGURES, step 14 is formed by the profiling of the supporting arms 1a and 1b during the stamping operation. Step 14 is arranged on the surface 19 of leg 2 and extension 3 regarding the left-hand supporting arm 1b in FIG. 2. Step 14 can be seen on the right-hand side in FIG. 2, while it is covered by the projecting portion 15 on the left-hand side, therefore, it is shown in broken lines. On rotation of the blade 33 in the direction of the arrow 8, the step 14 serves to achieve a good cutting result and also an effective agitating action because the food materials are turned when bouncing on the step 14 and, thus, are agitated thoroughly. The same applies to the chamfered surfaces 35, 36 which, due to their arrangement, provide the additional advantage of actually throwing the food materials from one to the other. This is achieved in FIG. 2 because the chamfered surface 35 is directed upwardly and the chamfered surface 36 is directed downwardly, when viewed in the direction of rotation 8, so that the food materials are moved upwardly by the right supporting arm, from where they are bounced downwardly by the left supporting arm and vice-versa. This serves to comminute the food materials in a particularly short time. The special arrangement of the chamfered surfaces also minimizes the axial forces which act on the operating shaft 9 during agitating so that the bearing assemblies arranged in the stem 38 and the adjacent electric drive motor (not shown) are subjected to reduced load. The stem 38 is an extension of the bell-shaped lid 29 which is followed upwardly by the motor housing accommodating the electric motor in FIG. 2.

As can also be seen in FIG. 1, extensions 3 which extend in opposition to the direction of rotation 8 and form a joint cutting edge with the cutting edges 18 are adjacent to the legs 2. The horizontally directed cutting edges 17 of the leg 2 and the cutting edges 18 which extend at the radially external edge transversely upwardly (right side) and transversely downwardly (left side) form an angle 16 which is larger than 90°. Preferably, it ranges between 90° and 160°. Particularly good cutting results are achieved with an angle of 120° because in this event the space 39 formed by the inside wall 34 of the bell-shaped lid 29 and the cutting edge 18 is sufficiently large to receive large pieces of more solid food materials such as carrots, apples, etc., for clamping and subsequently cutting them. However, this action is carried out at high rotational speeds of the handheld blender of approximately 3000 to 10000 revolutions per minute. Additionally, the angle of 120° provides a sufficient length of the cutting edge 18 to achieve a particularly long useful life of the blade 33.

The distance 'o' between the points of deflection 21 amounts to about 10 mm, and the step 14 is sized roughly 0.4 mm.

We claim:

1. A blade for use in an electrically operated handheld blender which during use is attached to a rotatingly driven operating shaft said blade comprising:

first and second blade supporting arms extending radially and diametrically from an axis of the operating shaft, each of said blade supporting arms including a knife-edge, the knife-edge of a first of said blade supporting arms being directed upwardly and the knife-edge of a second of said blade supporting arms being directed downwardly, a cutting edge facing in a direction of rotation of said operating shaft, a chamfered surface extending outwardly to the cutting edge, and a portion projecting from a surface of the blade supporting arm, the projecting portion having one side confined by the knife-edge and another side confined by the chamfered surface, the knife-edge and the chamfered surface enclosing a chamfer angle.

2. A blade as claimed in claim 1, wherein the chamfered surface of the second supporting arm faces upward, while the chamfered surface of the first supporting arm faces downward.

3. A blade as claimed in claim 1, wherein the blade is a punched part on which the projecting portion of each blade supporting arm is formed by stamping.

4. A blade as claimed in claim 1, wherein the chamfer angle ranges from 15° to 30°.

5. A blade as claimed in claim 4, wherein the chamfer angle is 20°.

6. A blade as claimed in claim 1, wherein said blade supporting arm surface defines a first plane and said knife edge defines a second plane substantially parallel to the first plane and slightly offset relative to the first plane.

7. A blade as claimed in claim 1, wherein each blade supporting arm is inclined by an angle of inclination in the same direction as the blade supporting arm knife edge is directed.

8. A blade as claimed in claim 7, wherein the angle of inclination ranges between 9° and 13°.

9. A blade as claimed in claim 8, wherein the angle of inclination is 11°.

10. A blade as claimed in claim 1, wherein the cutting edge includes first and second cutting edges extending with respect to each other at an angle of 90° to 160°.

11. A blade as claimed in claim 10, characterized in that the width of the supporting arm amounts to roughly 7 mms, the diameter of the blade amounts to roughly 50 mms, the distance defining the beginning of the angles of inclination amounts to roughly 18 mms, and the thickness of the sheet metal of the blade amounts to roughly 1 mm.

12. A blade as claimed in claim 10, wherein the first and second cutting edges extend with respect to each other at an angle of 120°.

* * * * *